(No Model.)

F. R. ALLEN.
HEADER ATTACHMENT FOR HARVESTERS.

No. 245,337. Patented Aug. 9, 1881.

Witnesses,
Geo. H. Strong.
Frank A. Brooks

Inventor,
Franklin R. Allen
By Dewey & Co.
Attys

UNITED STATES PATENT OFFICE.

FRANKLIN R. ALLEN, OF MODESTO, CALIFORNIA.

HEADER ATTACHMENT FOR HARVESTERS.

SPECIFICATION forming part of Letters Patent No. 245,337, dated August 9, 1881.

Application filed March 12, 1881. (No model.)

*To all whom it may concern:*

Be it known that I, FRANKLIN R. ALLEN, of Modesto, county of Stanislaus, State of California, have invented a Header Attachment for Combined Header and Thrasher; and I hereby declare the following to be a full, clear, and exact description thereof.

My invention relates to an attachment for a combined header and thrasher; and it consists in the construction, hinging, and balancing of the frame which carries the sickle and main draper, as pointed out in the claims, in such a manner as to permit it to be easily raised or lowered for high or low grain, the movement of the attachment being made independent of the main frame. It is especially adapted to be attached to such a combined harvester and thrasher as was patented in United States Patent No. 198,522, in which the heavy frame of the header is not moved with the hinged frame, the latter being moved alone.

Figure 1:
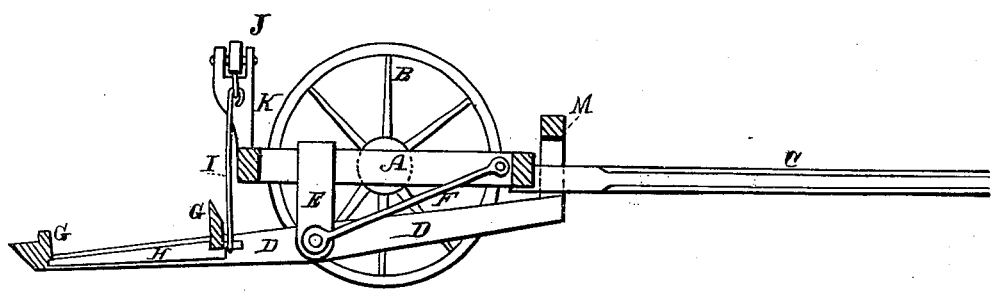
Figure 2:
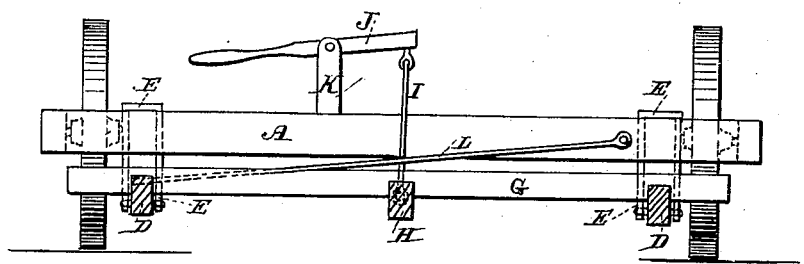

Referring to the accompanying drawings, Figure 1 is a longitudinal section. Fig. 2 is a transverse section.

A represents a frame which supports a combined header and thrasher; B, the bearing-wheels within the frame, and C the pole to which the horses are attached.

Under the frame A, just inside the wheels, are the arms D, pivoted at their middle respectively to the stirrups E, which attach them to the frame A. The stirrups E are each supported from one of the frame-timbers inclosing the wheels, as shown, and are hung loosely thereon. Braces F extend diagonally from the lower part of the stirrups to a point upon the frame-timbers, and allow the stirrups to be raised, when necessary, and cause them to return to their proper bearings without moving back or forward when again depressed.

The forward ends of the arms D project beyond the front of the frame and carry the parallel bars G, which, together, constitute the frame for carrying the sickle, main draper, and reel. The parallel bars G are further connected by the central strip, H, having its inner end projecting to form a connection for the connecting-rod I, which passes up to the lever J, supported above the frame A by the standard K.

A brace, L, attached to one of the arms D and to the front of the frame A, extends diagonally between these points and prevents any side play of the carrying-frame, while allowing it to be raised or lowered. The rear ends of the arms D pass back and are turned up behind the frame A and joined by a heavy bar or timber, M, passing over the pole C. The object of this heavy bar M is to balance the front part of the swinging frame, which, on account of being hinged at the middle, as shown, requires very little power to raise or lower it. The lever J with its rod I are sufficient for this purpose. It is so nearly balanced of itself that the direct leverage, such as here shown, is amply sufficient for the purpose. By hinging the frame at its center and balancing it thus the weight is taken from the ends and transferred equally to the middle, which will prevent the twisting of the main frame, whereby the shafting of the thrashing apparatus would be thrown out of line.

The stirrups E, being loosely hung from the frame, will allow the swinging frame to be pushed up when the wheels sink so low as to cause the arms D to strike the ground, the stirrups moving freely and dropping back to their places when the obstruction is passed. When so pushed up the swinging frame can be raised or lowered, as before, and is thus not liable to be impeded in its operation.

Having thus described my invention, what I claim as new, and desire to secure by Letters Patent, is—

1. The attachment for combined headers and thrashers herein described, consisting of the arms D, hinged at their middle to the frame A by the stirrups E, and braced as shown, their front ends supporting the sickle and draper, and their rear ends being weighted, the entire swinging frame being balanced, substantially as herein described.

2. In a combined header and thrasher, the swinging frame composed of the curves D, bars G, and weight M, adapted to be raised or lowered by the lever J, in combination with the inclined brace L, substantially as described.

3. In a combined header and thrasher, the main supporting-frame A, in combination with the frame carrying the sickle and draper centrally suspended from the main frame by the stirrups E, which allow a vertical movement to the sickle-frame, the diagonal braces F and L, the operating-lever J, and the counter-balance M, substantially as described.

In witness whereof I have hereunto set my hand.

FRANKLIN R. ALLEN.

Witnesses:
S. H. NOURSE,
FRANK A. BROOKS.